(12) United States Patent
Froehlich (10) Patent No.: US 10,326,640 B2
(45) Date of Patent: Jun. 18, 2019

(54) KNOWLEDGE BASE RADIO AND CORE NETWORK PRESCRIPTIVE ROOT CAUSE ANALYSIS

(71) Applicant: Tektronix, Inc., Beaverton, OR (US)

(72) Inventor: Robert W. Froehlich, McKinney, TX (US)

(73) Assignee: NetScout Systems Texas, LLC, Westford, MA (US)

( * ) Notice: Subject to any disclaimer, the term of this patent is extended or adjusted under 35 U.S.C. 154(b) by 102 days.

(21) Appl. No.: 14/621,101

(22) Filed: Feb. 12, 2015

(65) Prior Publication Data

US 2016/0241429 A1 Aug. 18, 2016

(51) Int. Cl.
*H04L 12/24* (2006.01)
*H04W 24/04* (2009.01)
*H04W 24/08* (2009.01)

(52) U.S. Cl.
CPC ........ *H04L 41/0631* (2013.01); *H04L 41/142* (2013.01); *H04L 41/5009* (2013.01); *H04L 41/5035* (2013.01); *H04W 24/04* (2013.01); *H04W 24/08* (2013.01)

(58) Field of Classification Search
CPC ............. H04L 41/0631; H04L 41/5035; H04L 41/5009; H04L 41/142
USPC ........................................................ 455/423
See application file for complete search history.

(56) References Cited

U.S. PATENT DOCUMENTS

| | | | | |
|---|---|---|---|---|
| 7,092,707 B2* | 8/2006 | Lau | ....................... | H04L 41/042 379/29.01 |
| 9,204,319 B2* | 12/2015 | Ouyang | ................ | H04W 24/02 |
| 2007/0008879 A1* | 1/2007 | Wallenius | ............... | H04L 41/06 370/216 |
| 2013/0227103 A1* | 8/2013 | Garimella | ........... | H04L 41/5054 709/223 |
| 2015/0092746 A1* | 4/2015 | Jang | ...................... | H04W 24/08 370/331 |
| 2017/0155544 A1* | 6/2017 | Khanna | ............... | H04L 41/0668 |

* cited by examiner

*Primary Examiner* — Shahriar Behnamian
(74) *Attorney, Agent, or Firm* — Locke Lord LLP; Scott D. Wofsy; Christopher J. Capelli (57) ABSTRACT

A method, computer program product and system for performing performance and root cause analysis of failures in a telecommunication network are provided. The telecommunication network includes User Equipment (UE) devices, core network and radio access network (RAN). Information related to impacted performance and failures reported in the telecommunication network is received. Telecommunication and transport network elements associated with the reported network performance and failures are identified. Performance and configuration data associated with the identified network elements is analyzed to identify one or more causes of the reported network failures. A root cause analysis of the reported network failures is performed using knowledge and statistical inference models for each of the identified causes to provide at least one recommendation for resolving the reported network failures.

16 Claims, 5 Drawing Sheets

KNOWLEDGE BASE RADIO AND CORE NETWORK PRESCRIPTIVE ROOT CAUSE ANALYSIS

FIELD OF THE INVENTION

This specification is directed, in general, to telecommunication networks, and, more particularly, to knowledge base radio, core, and Voice Over Long Term Evolution (VOLTE)/IP Multimedia Subsystem (IMS) network prescriptive root cause analysis and performance analysis.

BACKGROUND OF THE INVENTION

In today's highly competitive telecommunications industry, service providers provide customers (subscribers) with a wide variety of voice, data, video, and internet services. Because of the complexity of service provider network systems and network equipment being deployed in the field to provide such services, service providers must utilize highly trained technicians to install and fix problems encountered by subscribers.

Typically, service providers utilize call centers that have trained personnel to answer calls from subscribers, to perform the analysis of the problem and to provide a proposed solution. More technical issues are typically referred to tier 2 and tier 3 technicians. Due to the complexity of the systems involved, such call centers may receive a very large number of support calls from subscribers or technicians in the field. Typically, the trained personnel answering the calls begin troubleshooting by performing triage in order to determine, for example, whether the reported problem is related to either radio or core network, whether the problem is subscriber specific or systemic to a subset of subscribers, and so on. After performing the triage the trained support personnel usually apply their empirical knowledge to ascertain possible root causes of the reported problems and to assist with resolution of such problems. However, such calls can be costly in terms of time and resources needed to train the personnel answering the calls from subscribers, and in terms of the time and resources utilized by employing such trained personnel.

Accordingly, it would be advantageous to provide a more efficient troubleshooting process in various telecommunication networks.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method and system for performing root cause analysis of failures in a telecommunication network is provided. The telecommunication network includes a core network and radio access network (RAN). Information related to failures reported in the telecommunication network is received. Network elements associated with the reported network failures are identified. Performance and configuration data associated with the identified network elements is analyzed to identify one or more causes of the reported network failures. A root cause analysis of the reported network failures is performed using a knowledge model for each of the identified causes to provide at least one recommendation for resolving the reported network failures.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

A communication network is a geographically distributed collection of nodes interconnected by communication links and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Figure 1:
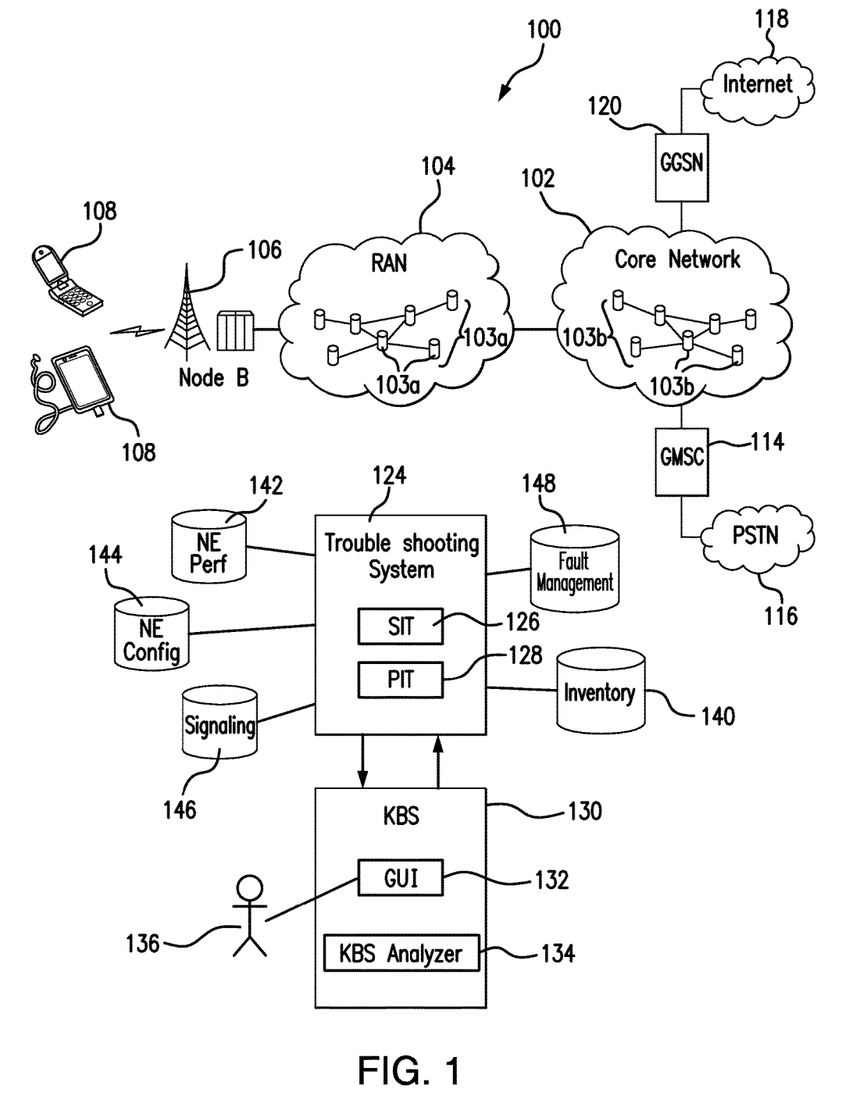
FIG. 1 illustrates an example communication network in accordance with an illustrated embodiment.

FIG. 1 illustrates a block diagram of a network monitoring environment according to some embodiments. For example, network 100 may include a wireless broadband network, a 3G network, a 4G network, a 3GPP Long Term Evolution (LTE) network, etc. Various embodiments of the present invention will now be described, by way of example only, and with reference to Universal Mobile Telecommunications Systems (UMTS) network 100 architecture in accordance with current Third Generation Partnership Project (3GPP) and Third Generation Partnership Project 2 (3GPP2) specifications. The illustrated UMTS network 100 architecture includes a core network 102 interconnected with a Radio Access Network (RAN) 104 via an interface known as Iu which is defined in detail in the current publicly available 3GPP specification documents.

The RAN 104 is configured to provide wireless telecommunication services to users through User Equipments (UEs) 108 via a radio interface known as UU. The RAN 104 has base stations, known as NodeBs 106 in 3GPP, which collectively provide for the geographic coverage for wireless communications with UEs 108. In the RAN 104, groups of one or more NodeBs 106 are connected to a Radio Network Controller (RNC) 110 via an interface known as Iub in 3GPP. The RAN 104 may have several groups of NodeBs 106 connected to different RNCs 110; two are shown in the example depicted in FIG. 1. Where more than one RNC 110 is provided in a RAN, inter-RNC 110 communications are preferably performed via the Iub interface. It is noted, while the embodiments are described herein with reference to UMTS network 100 architecture and Iub protocol, the description herein is not so limited, and may be applied to a variety of interfaces including, but not limited to, Common Public Radio Interface (CPRI).

Under current 3GPP specifications, the core network 102, and preferably not the RAN 104, is configured with connectivity to external systems such as Public Land Mobile Networks (PLMN), Public Switch Telephone Networks (PSTN) 116, Integrated Services Digital Network (ISDN) and other Real Time (RT) services via an RT service interface. Core network 102 will also support Non-Real Time (NRT) services with the Internet 118. Under current 3GPP specifications, the core network 102 provides RT service external connectivity via a Gateway Mobile Switching Center (GMSC) 114. The core network 102 preferably provides NRT service, known as General Packet Radio Service (GPRS), external connectivity via a Gateway GPRS Support Node (GGSN) 120. In this context, a particular NRT service may actually appear to a user to be a real time communication due to the communication speed and associated buffering of the Time Division Duplex (TDD) data packets forming the communication. One example of this is voice communication via the Internet 118 which can appear to the user as a normal telephone call conducted by a switching network, but is actually being conducted using an Internet Protocol (IP) connection which provides packet data service.

The RAN 104 segment of a conventional UMTS 100 architecture is preferably split into two traffic planes known as the C- and U-planes. The C-plane carries control (signaling) traffic, and the U-plane transports user data. The over-the-air segment of the RAN 104 involves two interfaces: the Uu interface between UE 108 and NodeB 106, and the Iub interface between the NodeB 106 and RNC 110.

One of the most significant signaling protocols on the over-the-air segment of the RAN 104 is Radio Resource Control (RRC). RRC manages the allocation of connections, radio bearers and physical resources over the air interface. In 3GPP, RRC signaling is carried over the Radio Link Control (RLC) and Medium Access Control (MAC) UMTS protocols between the UE 108 and RNC 110. Overall, RNC 110 is responsible for the allocation/de-allocation of radio resources, and for the management of key procedures such as connection management, paging and handover.

Still referring to FIG. 1, many packets traverse communicatively coupled core network elements 103b and RAN network elements 103a (hereinafter collectively referred to as "network elements 103"), as calls and data are exchanged between UEs 108 and endpoints 101 (e.g., border elements, application servers, or the like). These packets may represent many different sessions and protocols. For example, the Internet Protocol (IP) Multimedia Subsystem (IMS) is a standard that has been developed to define the control and integration of multimedia services in a core, packet-switched network. In particular, the IMS architecture defines a set of logical functions that use a signaling protocol known as the session initiation protocol (SIP) to establish communication sessions in an IP network. A "session" may be, for example, a one-to-one voice call or a more complex interaction, such as a one-to-many conference call involving multimedia services. SIP may also be used to facilitate voice over IP (VoIP) services, in which voice is transported in IP data packets that are re-assembled and converted into an audio signal for the recipient. IMS may be characterized as a standardized way to connect IP devices and networks using SIP. Accordingly, if UE 108 is used for a voice or video call, then it may exchange VoIP or SIP data packets with a SIP/VoIP server (i.e., the endpoint 101) using Real-Time Transport Protocol (RTP). If endpoint 101 is used to send or retrieve email, UE device 108 may exchange Internet Message Access Protocol (IMAP), Post Office Protocol 3 Protocol (POP3), or Simple Mail Transfer Protocol (SMTP) messages with an email server (i.e., the endpoint 101). If endpoint 101 is used to download or stream video, UE 108 may use Real Time Streaming Protocol (RTSP) to establish and control media sessions with a video server (i.e., the other endpoint not shown in FIG. 1). In some cases, communications may be had using the GPRS Tunneling Protocol (GTP).

In the RAN 104 segment U-plane data (e.g., speech, packet data, and circuit-switched data) uses the RLC/MAC layers for reliable transfer over the air interface (between UE 108 and RNC 110). Over the Iub segment, this data flow (user data/RLC/MAC) occurs over UMTS-specified frame protocols using the ATM Adaptation Layer Type 2 (AAL2) protocol over the ATM physical layer running (AAL2/ATM). It will be understood that packets exchanged between endpoints 101 and UEs 108 may conform to numerous other protocols now known or later developed. In this context, a protocol consists of a set of rules defining how the network elements interact with each other.

As the complexity of telecommunications networks continues to grow, the level of required reliability and availability of the networks continues to rise correspondingly. These factors place an increasing burden on diagnostic and troubleshooting systems that are used to isolate and correct network problems. For network service providers, quick and accurate problem diagnosis and correction is critically important aspect. Furthermore, quality monitoring is another important aspect for service providers. In a wireless telecommunications network, such as UMTS network 100, Quality of Experience (QoE) is a measure of a customer's experiences using mobile services. QoE takes into account the needs and the desires of the subscribers when using a mobile service.

Advantageously, various embodiments of the present invention contemplate a monitoring and troubleshooting system that efficiently and accurately evaluates signaling, performance and configuration data of both core network 102 and RAN 104 to identify at least one cause of reported and/or anticipated network related failures and applies procedural and iterative root cause analysis to provide automatic recommendations for resolving the reported network failures. According to an embodiment of the present invention, a troubleshooting system 124 may include, but not limited to, a computer server operatively coupled to each segment of UMTS network 100 and to a operations support systems (OSS) platform (interchangeably referred to herein as the "network management platform"). At the highest level, the network management platform provides the computer resources required to perform various network management functions, such as billing, customer care, network management, inventory control, maintenance, trouble ticket reporting, surveillance and service provisioning. In some embodiments, the network management platform comprises a plurality of applications, such as performance, fault, configuration and security management applications. As shown in FIG. 1, troubleshooting system 124 may communicate with various data repositories maintained by the network management platform, such as, but not limited to network inventory database 140, network equipment performance database 142, network equipment configuration database 144, network signaling database 146, fault management database 148, and the like.

Network inventory 140 may be any database capable of storing data relating to network 100. Network inventory 140 includes network discovered physical inventory, network discovered logical inventory, and planned network inventory. In one embodiment, network inventory database 140 stores information about network equipment, cell sites, IP transport, or the like. In some embodiments, network inventory 140 may store physical network information and logical network information. The physical network information specifies the physical components in the telecommunications network 100 and how the physical components are physically connected to one another in the network 100. For example, the physical network information may include the number of machines, managed switching elements (e.g. message routers and broadband network gateway), and how the components are physically connected to one another in the monitored network 100. The logical network information may specify the logical connections between a set of physical components in the monitored network 100 (e.g., machines) and a mapping of the logical connections across the physical components of the monitored network 100. Additionally, network inventory 140 may store Network Function Virtualization (NFV) information. NFV, as described in the European Telecommunications Standards Institute (ETSI) group specification (GS) NFV 002 v1.1.1, entitled "Network Functions Virtualisation (NFV); Architectural Framework," published October 2013, which is incorporated herein as if reproduced in its entirety, consolidates many types of physical network devices onto one or more general purpose servers, switches, storage, and/or other general purpose network nodes. For example, NFV may implement network functions performed by a variety of physical network devices that include, but are not limited to switching elements, mobile network nodes (e.g. GMSC 114 and GGSN 120), traffic analysis (e.g. deep packet inspection (DPI) and quality of service (QoS) measurement), application level optimization (e.g. application accelerators and content distribution networks (CDNs)), and security functions (e.g. firewall). By consolidating the physical network devices, NFV provides greater flexibility for network 100 by implementing network functions that can be moved to and/or instantiated in various locations in the network 100 without the installation and configuration of new physical network devices.

Network equipment performance database 142 may store data collected by a performance management system. In current GSM, GPRS, CDMA2000 and UMTS networks, the service area is divided into cells covering limited geographical areas. Performance database 142 may store performance counters and events for these cells among other performance related information. These counters provide information about the performance and traffic load in specific cells, such as cell capacity, the amount of signaling in specific cells, etc. The network equipment configuration database 144 stores data that defines a configuration for telecommunication network 100.

A session, call, or data record is created for each UE 108 using messages, signals, and/or data collected or intercepted by monitoring probes 107 from various network interfaces. A monitoring system, such as monitoring probes 107 and monitoring server (not shown in FIG. 1), may be coupled to interfaces and links in the network to passively monitor and collect signaling data from one or more interfaces in the network. The monitoring system may collect user plane and control plane data from the interfaces. The monitoring probes 107, may comprise, for example, one or more processors running one or more software applications that collect, correlate and analyze Protocol Data Units (PDU) and data packets from both RAN 104 and core 102 network interfaces and links. Probes 107 and/or the monitoring server may correlate the information captured on different interfaces and associate it with a particular UE 108. All collected data may be stored in network signaling database 146. Another example of signaling data collected from network 100 would be to obtain switching and routing table information or subscribers IP trace route information using well-known real time processing programs such as rtTrace.

Fault management database 148 preferably stores information related to a service related network fault events. The events may be collected from a distributed network event database representing different subsystems (transport, layer 3 control signaling, tunneled user plane, etc.) or protocol layers of telecommunication network 100. It is noted that fault management data can be aggregated on different levels, that is per cell, per event, per service, per area, etc., based on data obtained from RAN network elements 103*a* and core network elements 103*b*. However, common communication systems have in fact limited the set of possible fault events, for the reason that it may be difficult to represent all possible problem sources. For example, routers typically report lost packets. However, they do not report packet reordering. Packet reordering as such is not considered to be an important performance fault in transport networks. Nevertheless, there are services that are sensitive to high levels of reordering of packets. This type of fault events, packet reordering in routers, is therefore not detectable by fault management systems that are purely based on fault reporting from the network.

As shown in FIG. 1, troubleshooting system 124 may be communicatively connected to both the core network 102 and RAN 104. In an embodiment of the present invention, troubleshooting system 124 may comprise, or otherwise may cooperate with a subscriber issue troubleshooting (SIT) software program 126 and performance issue troubleshooting (PIT) software program 128. SIT program 126 and PIT program 128 may comprise program instructions stored on one or more computer-readable storage devices, which may include internal storage on the troubleshooting system 124. A plurality of communication sessions including data transfer sessions, Voice-over-IP (VoIP) and video communication (including video on demand) and streaming audio and video sessions, such as, but not limited to, interactive video conferencing sessions may be transmitted across UMTS network 100. SIT 126 may be, for example, a computer program or program component capable of determining causes of network related issues reported by subscribers and capable of performing root cause analysis of the reported issues to provide certain information, such as countermeasures for resolving the reported failures. PIT 128 may be, for example, a computer program or program component capable of anticipating network performance related issues and/or determining causes of such issues and capable of performing root cause analysis of the reported/anticipated issues to provide resolution recommendations. Operational steps of SIT 126 and PIT 128 programs are described in more detail below.

According to an embodiment of the present invention, SIT 126 and PIT 128 may be capable of providing resolution recommendations for a plurality of detected network failures by communicating with a knowledge base system (KBS) 130. In one embodiment, KBS 130 may be designed to apply formal representations of domain knowledge or expertise to solve network related problems. Symbolic descriptions (e.g., in the form of rules, frames, predicate logic, etc.) of this expertise characterize the definitional and empirical relationships in a domain. This approach of knowledge models has been found advantageous in automating troubleshooting tasks that may become too complex to be accomplished by human experts. As shown in FIG. 1, KBS 130 may be communicatively connected to troubleshooting system 124. In an embodiment of the present invention, KBS 130 may comprise, or otherwise may cooperate with a KBS analyzer software program 134. KBS analyzer 134 may comprise program instructions stored on one or more computer-readable storage devices, which may include internal storage on the knowledge base system 130. KBS analyzer 134 may be, for example, a computer program or program component utilized as the inference engine of knowledge based system 130 that matches the current inputs to relevant elements in knowledge base 130. In some embodiments, KBS analyzer 134 may provide the means to re-assess the state of a situation during each cycle of a reasoning mechanism. As a result, KBS analyzer 134 may be capable of reacting to a dynamic situation more readily than conventional programs.

Additionally, KBS 130 may include a user interface, such as graphical user interface (GUI) 132 program. In one embodiment, GUI 132 may comprise a framework for collecting user feedback from various users 136, such as network technicians, with respect to the actual causes of the reported network issues and with respect to recommended countermeasures. This historical information may be incorporated into the root cause analysis to provide more accurate recommendations as described in more detail below.

It is noted that the UE 108 is depicted in FIG. 1 as a mobile wireless device such as a cell phone or smart phone. However, it may be any portable device, such as a laptop, notebook, tablet computer, palm-sized computer, or any electronic device with capability to receive communication (i.e. wireless) signals.

Those skilled in the art will understand that any number of nodes, devices, links, etc. may be used in the computer network, and that the view shown herein is for simplicity. Also, while the embodiments are shown herein with reference to UMTS network 100 architecture, the description herein is not so limited. For purposes of the present patent application, the RAN 104 may be implemented in any combination of known or heretofore unknown radio access technology and network protocols. For instance, the RAN 104 may comprise a combination of UMTS Terrestrial Radio Access Network (UTRAN), Wireless Local Area Network (WLAN), Digital Enhanced Cordless Technology (DECT), GSM EDGE Radio Access Network (GERAN), Worldwide Interoperability for Microwave Access (WiMAX) network, Device to Device (D-D), etc. The RAN 104—can also be an aggregation of channels from multiple bands in the radio access technology LTE-A (Long Term Evolution—Advanced), also known as fourth generation (4G) networks. LTE-A is a set of enhancements to the UMTS that includes an all-IP networking architecture and the ability of each NodeB 106 to connect to multiple core networks. In some embodiments, RAN 104 may comprise Voice over LTE (VoLTE)-enabled network. The RAN 104 depicted in FIG. 1 includes one or more NodeBs 106, each NodeB 106 providing wireless access to a respective service coverage region. In alternative embodiments, the RAN 104 may include other types of access points that include relays, femtocells and picocells.

Figure 2:
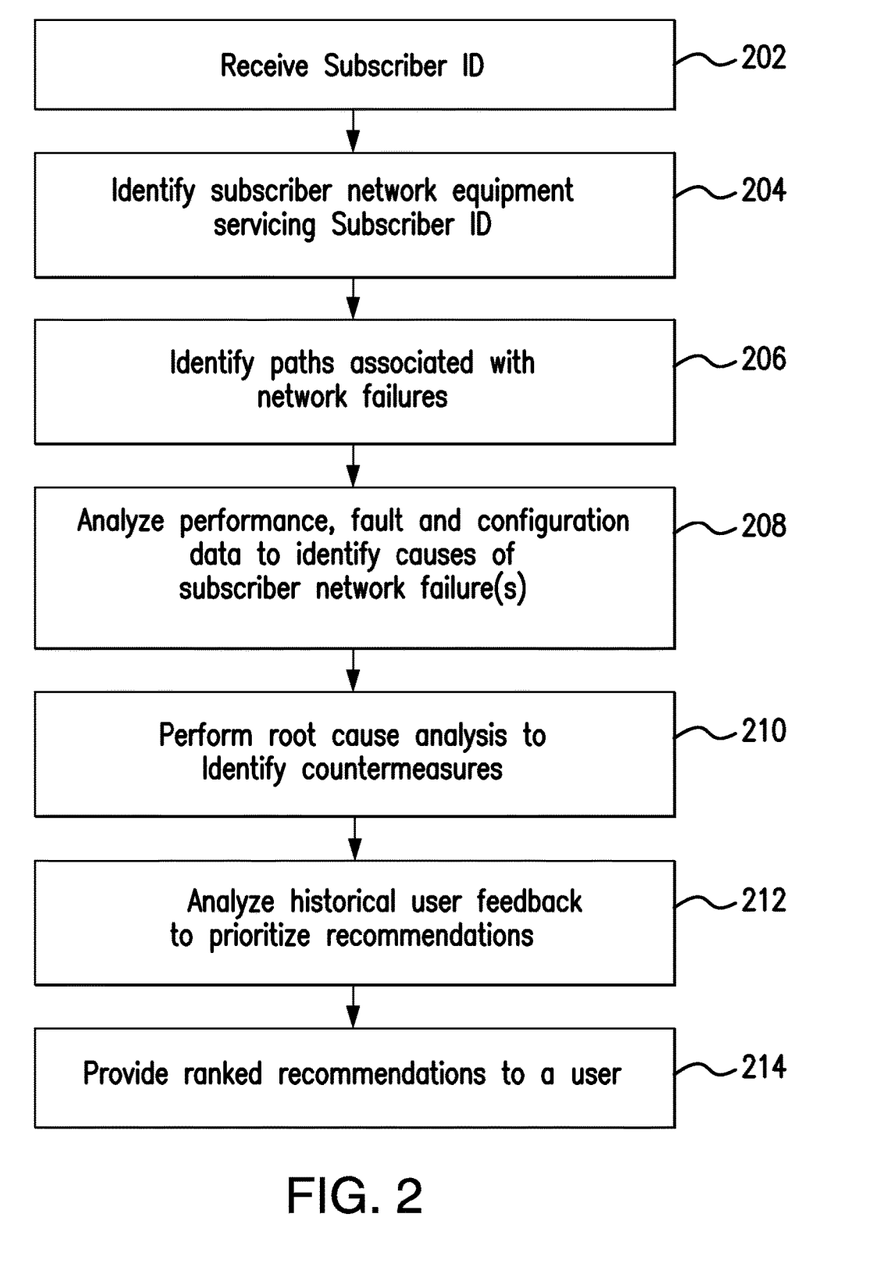
FIG. 2 is a flowchart of operational steps of a subscriber issue troubleshooting program of FIG. 1 in accordance with illustrative embodiments of the present invention.
Figure 3:
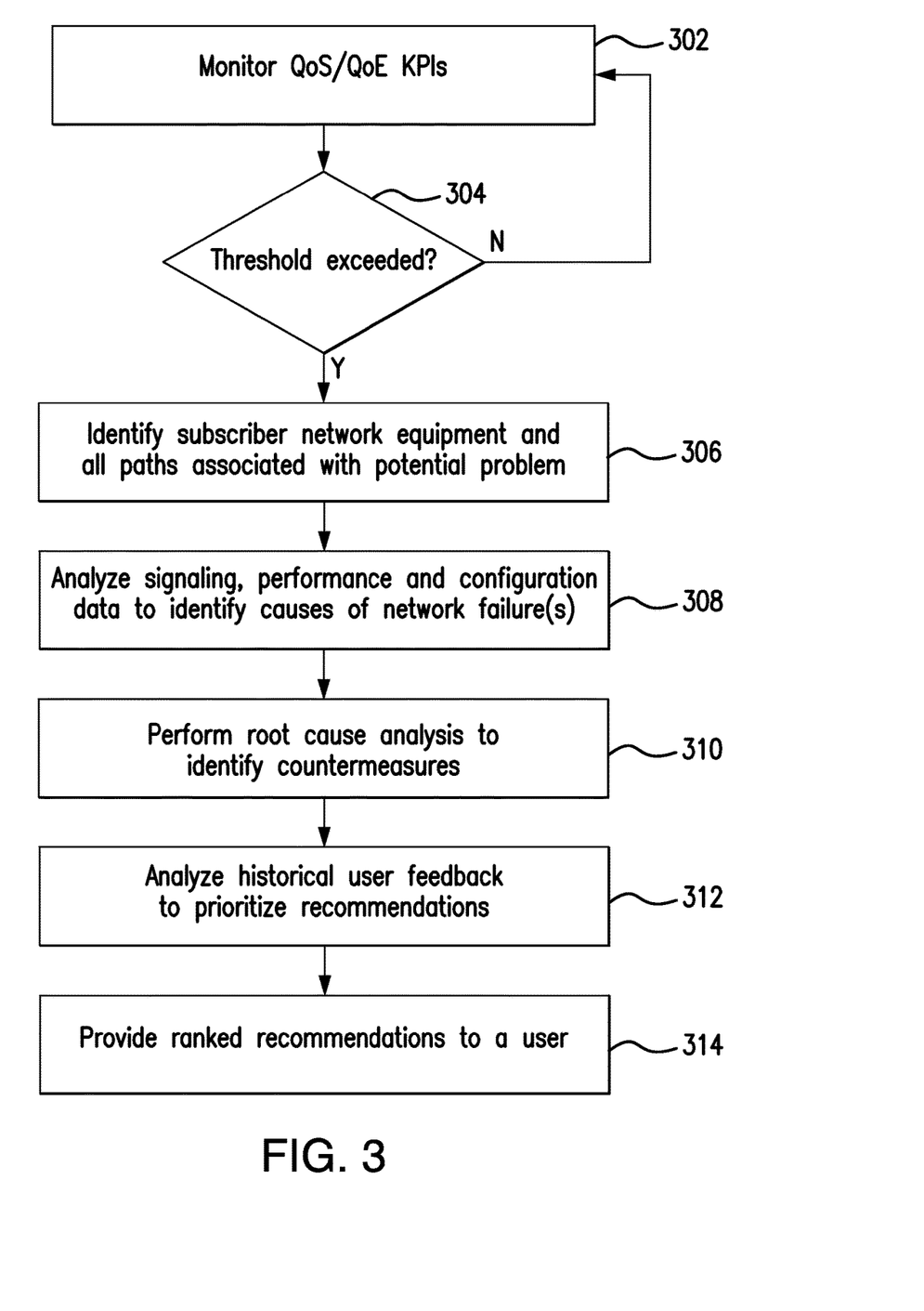
FIG. 3 is a flowchart of operational steps of a performance issue troubleshooting program of FIG. 1 in accordance with illustrative embodiments of the present invention.

FIGS. 2 and 3 are flowcharts of operational steps of SIT program 126 and PIT program 128 of FIG. 1, in accordance with exemplary embodiments of the present invention. Before turning to descriptions of FIGS. 2 and 3, it is noted that the flow diagrams shown therein are described, by way of example, with reference to components shown in FIG. 1, although these operational steps may be carried out in any system and are not limited to the scenario shown in the aforementioned figures. Additionally, the flow diagrams in FIGS. 2 and 3 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting with FIG. 2, FIG. 2 is a flowchart of operational steps of a subscriber issue troubleshooting program (SIT) of FIG. 1 in accordance with illustrative embodiments of the present invention. Typically, telecommunications service providers provide multimedia call centers for receiving and responding to telephone calls (or other communication messages) made by subscribers requesting repairs for telecommunications equipment and services. In a typical call center scenario, telephone calls are answered in order by customer service assistants (CSAs) who create reports of newly reported problems (i.e., trouble reports) for later referral to a technician for repair or provide status information regarding existing trouble reports. Accordingly, in one embodiment of the present invention, at 202, SIT program 126 may retrieve the subscriber information from corresponding trouble reports provided to troubleshooting system 124 by CSAs or automated customer service support platform. The subscriber information may also specify an issue type, such as, but not limited to, access, retainability or QoS issues.

At 204, SIT 126 may analyze signaling data stored in signaling database 146 and may correlate call flows for end-to-end call trace troubleshooting associated with the provided subscriber identification information. In other words, SIT program 126 collects both control plane and user plane signaling message data for one or more network failures reported in the telecommunication network 100. The network failures may be associated with the subscriber id. In one embodiment, SIT program 126 may generate a text summary of the signaling between the network elements involved in each network failure (on and end-to-end basis) over the telecommunication network 100. In other words, such text summary identifies all network elements, for example by specifying a network element id, associated with each reported network failure. In addition, at 204, SIT 126 may retrieve physical network information and logical network information from the network inventory 140. At 206, SIT 126 preferably utilizes the generated signaling data summary and correlated logical and physical network information to identify one or more network communication paths facilitating communication that resulted in network failures. For example, such communication paths may include a network path between a particular UE device 108 and a particular endpoint 101. The identified path may include a plurality of RAN elements 103*a* and a plurality of core network elements 103*b* communicatively coupled to each other.

At 208, SIT 126 preferably analyzes and automatically correlates performance, fault, inventory and configuration data stored in databases 140-148 with corresponding signaling data to identify one or more causes of network failures. In some embodiments, at step 208, SIT 126 may determine an operational state of each of the identified network elements 103 based on the performance related information stored in network equipment performance database 142. For example, for each cell identified in the determined network path, SIT 126 may analyze cell capacity and CPU occupancy, RRC counter performance, user plane performance information, or the like. In addition, as previously noted, SIT 126 may automatically correlate the determined operational state of the identified network elements 103 at least with network fault management information and network configuration information stored in fault management database 148 and configuration database 144, respectively. With regard to core network 102, SIT 126 may also use additional information collected by the network elements 103*b*, such as, for example Simple Network Management Protocol (SNMP) data, information from syslogs on the network equipment and Change Management (CM) logs, to perform the analysis in step 208. In various scenarios, as a result of the performed analysis the root cause of a failure may be isolated to be related to cell coverage, exceeding cell resource capacity, a power device failure, or to a network device, cabling or transceiver failure. At least in some embodiments, the cause may be attributable to multiple simultaneous events.

Furthermore, it is contemplated that step 208 performed by SIT 126 may involve formulating and/or reformulating a problem statement describing a particular network related failure. At least in some cases the originally formulated problem statement may need to be reformulated. For instance, if the reported network failure originally indicated that it might have been caused by potential cell congestion but during the analysis performed at 208 SIT 126 determines that the actual cause of the reported failure is related to subscriber's location being substantially close to a cell boundary, SIT 126 preferably reformulates the original problem statement accordingly.

At 210, SIT 126 may perform a root cause analysis of the reported network failures using KBS 130 for each of the causes identified in step 208 to provide at least one remedial recommendation. Candidate countermeasures (remedial recommendations) may be fully determined by the iterative inference process performed by KBS analyzer 134. In other words, KBS analyzer 134 may perform additional queries or analysis of accumulated knowledge model to isolate countermeasures corresponding to each of the root causes of failures. In one embodiment, the knowledge model may include a plurality of inference rules predefined by various subject matter experts based on their empirical knowledge. Each of the plurality of predefined inference rules may associate at least one cause of the one or more reported network failures with at least one recommendation for resolving the reported network failures. In another embodiment, the knowledge model may further include a statistical inference model configured to analyze historical information related to previously provided recommendations in order to augment the recommendations provided by the plurality of predefined inference rules. In some embodiments, the statistical inference model may apply well-known statistical inference techniques to the knowledge model to estimate the relevance and effectiveness of the provided recommendations based on the accumulated historical information. In some embodiments, the knowledge model may use these estimates to distinguish recommendations that are more relevant and/or more likely to resolve the identified network failure from less relevant/effective recommendations.

According to an embodiment of the present invention, GUI 132 of KBS 130 may comprise a framework for collecting user feedback from various users 136, such as network technicians, with respect to the actual causes of the reported network issues and with respect to recommended countermeasures. GUI 132 may store feedback data from a plurality of users 136 in a user feedback database, which may be a storage component of KBS 130. Any user interaction with KBS 130, or application issued by KBS 130, may be included in the feedback data stored in such database. In one embodiment, for each reported network failure, GUI 132 may provide a list of potential causes as determined by SIT 126 in step 208 described above. In addition, for each potential cause presented GUI 132 may present a list of countermeasures/corrective actions determined by SIT 126 in step 210. It is noted that both the potential causes and the potential countermeasures may be presented in ranked order.

The user 136 may select any of the presented causes and any of the presented countermeasures/corrective actions. The selections may be recorded by GUI 132 into the user feedback database (not shown in FIG. 1) and may be used by troubleshooting and correlating processes, such as SIT 126 and PIT 128. Accordingly, the effects of user selections may be applied in future similar situations and affect the provided ranked causes and provided remedial recommendations. That is, to present the list of possible countermeasures/corrective actions, at 212, SIT 126 may adjust its correlation of likely causal events and may adjust its correlation of countermeasures/corrective actions to address detected network failures for a particular network element, and do so based on the historical user selections as well as based on general knowledge from preloaded heuristics analyzed by KBS analyzer 134. At 214, SIT 126 preferably presents the lists of potential causes and potential countermeasures in adjusted ranked order to users 136.

In summary, SIT 126 may be a computer program or program component capable of automatically determining potential causes of subscriber-related network issues and capable of performing root cause analysis of the reported issues in substantially non-deterministic system to provide potential countermeasures associated with the identified causes based on historical user feedback, preloaded heuristics and similar learned information from various user constituents.

Now referring to FIG. 3, FIG. 3 is a flowchart of operational steps of the performance issue troubleshooting program (PIT) of FIG. 1 in accordance with illustrative embodiments of the present invention. In one embodiment, PIT 128 may monitor subscriber and network traffic via probe devices 107 that collect user and control plane signaling from UEs 108, RAN 104 and core network 102, then process that traffic through a variety of stages to derive actionable information as it pertains to subscriber experience, such as QoS (quality of service), QoE (quality of experience), subscriber behavior (application usage, service usage, etc.), subscriber location, etc. In practice, actionable information may refer to statistical indicators (typically referred to as Key Performance Indicators or KPIs) that are computed from source data processed by the probes 107. A few examples of KPIs include Handover Success (by node, location, etc.), Call Drop Ratio (by node, handset, etc.), Application Usage (by node, subscriber, etc.), Subscriber Count (by location, demographic, etc.), and the like.

At 302, PIT 128 preferably monitors one or more telecommunication network's 100 quality characteristics. In an embodiment of the present invention, this step may involve PIT 128 monitoring KPIs associated with the plurality of communication sessions. A KPI of a session for a particular subscriber is indicative of a supply of application data needed to maintain a satisfactory quality of experience for the subscriber's session. PIT 128 may monitor voice and video media quality information such as mean opinion score (MOS), packet jitter, packet loss, latency, and delay, among other metrics. The KPIs which are relevant to monitor will depend on the type of communication session or service that is being monitored. In case of a video session, PIT 128 may calculate a corresponding MOS value. MOS is an industry standard metric for measuring QoE having a scale of 1-5. In addition, at step 302, PIT 128 preferably receives RAN service quality characteristics from the RAN monitor probes 107a. RAN service KPIs may include, but not limited to, RSCP (power of coverage indicator), Ec/No (interference indicator), cell capacity and coverage information, and the like. Various techniques for monitoring KPIs in the RAN 104 and core network 102 are well-known in the art and, therefore, are not described in detail herein.

According to an embodiment of the present invention, at 304, PIT 128 may periodically determine whether any of the thresholds associated with QoS KPIs have been exceeded. In response to determining that any of the thresholds have been exceeded (decision block 304, "yes" branch), at 306, PIT 128 preferably identifies one or more network elements, such as, but not limited to a particular access network cell associated with a potential network failure. In other words, the exceeded KPI threshold may be indicative of a brewing network-related issue. Accordingly, at 308, PIT 128 preferably analyzes and automatically correlates performance, fault, inventory and configuration data stored in databases 140-148 with corresponding signaling data to identify one or more causes of potential network failures. For example, at step 308, SIT 126 may use a cell ID of the cell identified at step 306, to extract all network flow, performance, fault management and configuration information attributable to the referenced cell ID from respective databases 140-148. It should be noted that the retrieved data sets are preferably indicative of both current and historical conditions. As an alternative example, at step 308, SIT 126 may obtain a list of all active subscribers supported by the referenced cell based at least on the correlated network performance and configuration information. It is contemplated that step 308 may further involve either formulating or reformulating a problem statement describing the identified cause of potential network failures as described above.

Steps 310-314 are substantially identical to operational steps 210-214 of SIT program 126 described above, such that these steps will not be described in detail again for the sake of brevity. The only difference is that the analysis of historical user feedback is performed for a potential network related issue rather than a subscriber reported issue. Furthermore, a ranked list of recommendations generated at step 314 may include a list of potential preventative rather than corrective actions.

Figure 4:
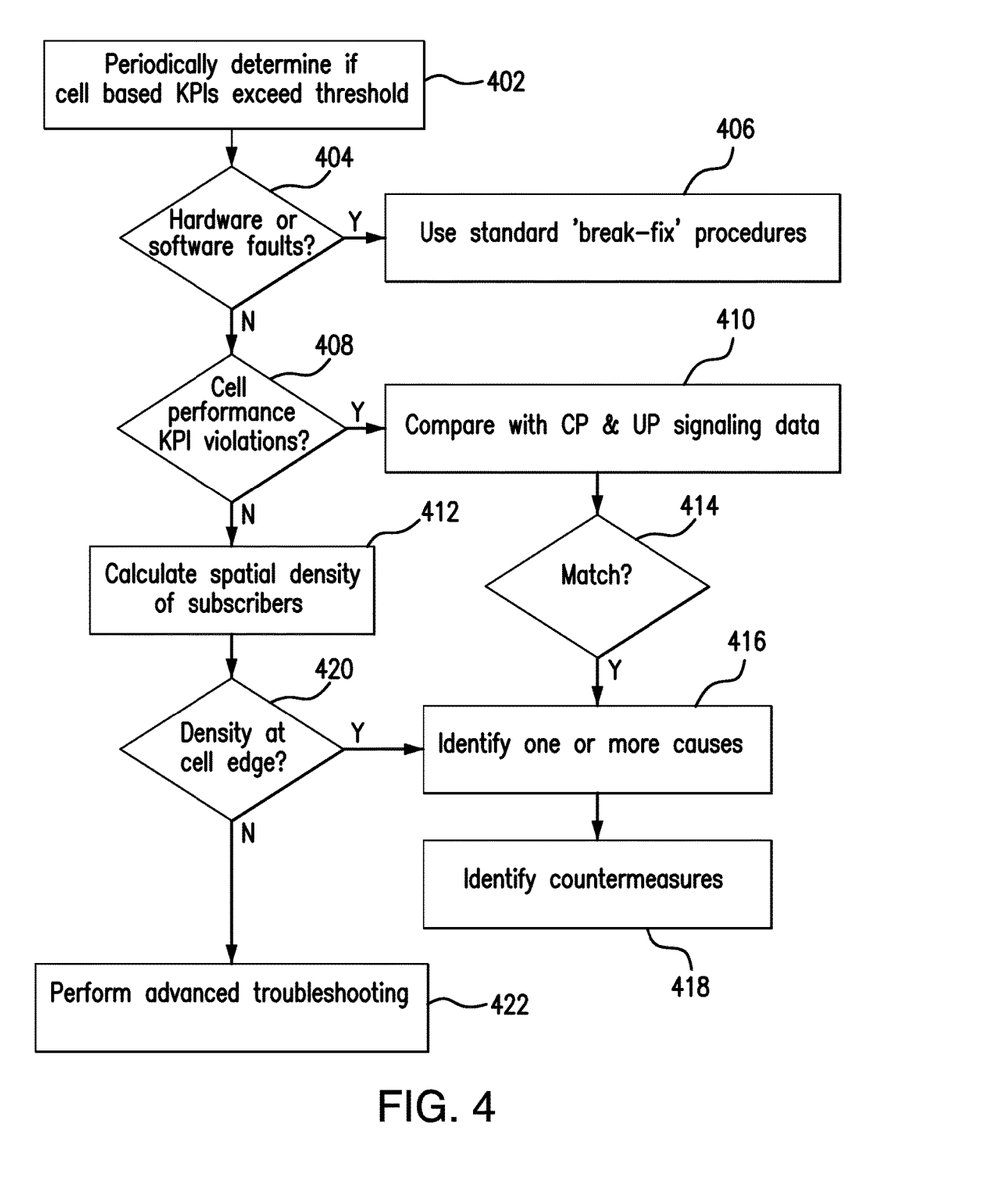
FIG. 4 is a flowchart illustrating troubleshooting of an exemplary systemic network performance issue in accordance with an alternative embodiment of the present invention.

FIG. 4 is a flowchart illustrating troubleshooting of an exemplary systemic performance issue using a predefined knowledge model in accordance with an alternative embodiment of the present invention. Assume for illustrative purposes that PIT 128 is configured to monitor only cell-based statistics. In one embodiment, at 402, PIT 128 may periodically determine if any of cell-based KPIs exceeded predetermined thresholds based on the performance data stored in network equipment performance database 142. For example, assume that in the illustrated example PIT 128 detects an abnormal drop rate for RRC connections associated with particular network cells. RRC connection rate typically reflects, to some extent, subscribers' experience on the telecommunications network 100 since it sets up and tears down the radio bearer link.

At 404, PIT 128 preferably analyzes fault related data stored in fault management database 148 to determine whether there are any reported hardware or software faults associated with the identified cells. In one embodiment, PIT 128 may detect software or hardware faults based on specifically designed and set fault traps. For example, various hardware alarms may exist in various elements of RAN 104 to identify detrimental hardware conditions. A high-temperature alarm incorporating a thermal sensor is one hardware example. Another example would be a layer 2 or 3 switching or routing failure. A software error log written by a software developer to catch a particular error condition is a software example. It is noted that these fault traps are limited to detecting localized faults and are only capable of identifying specific fault conditions. In response to detecting either software or hardware faults (decision block 404, "yes" branch), PIT 128 may provide a recommendation to address the detected network failures by using standard "break-fix" procedures. For example, the detected abnormal drop rate for RRC connections might be addressed by human intervention through appropriate parameter setting or other configuration changes.

According to an illustrative embodiment of the present invention, if PIT 128 does not detect any software/hardware faults (decision block 404, "no" branch), at step 408, PIT 128 may continue analysis of the performance data to determine whether there are any cell performance KPI violations associated with the identified cells. Such KPIs can include for example latencies, delays, success rates, and throughput values. In one embodiment, at this point in a troubleshooting procedure, PIT 128 may utilize a knowledge model to both identify causes of the detected network failure and identify recommended countermeasures to address the identified causes. In one embodiment, the knowledge model may include a plurality of inference rules predefined by various subject matter experts based on their empirical knowledge. Each of the plurality of predefined inference rules may associate at least one cause of the one or more reported network failures with at least one recommendation for resolving the reported network failures. Based on the knowledge model, in response to detecting any cell performance KPI violations (decision block 408, "yes" branch), at 410, PIT 128 may correlate performance data with user plane and control plane signaling data for the identified cells. As previously indicated, both control and user plane signaling data may be stored in network signaling database 146.

At 414, PIT 128 may determine whether the diagnosis inferred from analyzing signaling data matches the diagnosis inferred from analyzed performance KPIs. In other words, at 414, PIT 128 may try to confirm the cell performance issues identified at 408. In response to finding a match (decision block 414, "yes" block), at 416, PIT 128 may utilize the knowledge model to identify at least one cause of the detected network failure and may identify at least one countermeasure/remedial action to address the failure. It is contemplated that step 416 may further involve PIT 128 formulating a problem statement describing the identified cause of network failures. For example, the formulated problem statement may indicate that cell resources for particular cells reached their capacity. At 418, PIT 128, collectively with KBS analyzer 134, may further utilize the knowledge model stored in KBS 130 to identify one or more countermeasures corresponding to the cause indicated by the formulated problem statement. In one embodiment, the countermeasure provided at 418 by PIT 128 may suggest addressing the identified problem by adding additional cell processors, for example.

In response to finding no cell performance KPI violations (decision block 408, "no" branch), at 412, PIT 128 may calculate spatial density of subscribers using geolocated control and user plane signaling data. For example, the control plane signaling data may indicate a high density of subscribers in a particular area (for example, at a cell edge). Responsive to finding the high density of subscribers at a particular cell edge (decision block 420, "yes" branch), at 416, PIT 128 may identify one more causes of network failures and/or formulate/re-formulate the corresponding problem statement. For example, such problem statement may indicate that a plurality or median number of subscribers is located near a cell edge. At 418, PIT 128 in concert with KBS analyzer 134 may further utilize the knowledge model stored in KBS 130 to identify one or more countermeasures corresponding to the cause indicated by the formulated problem statement. In one embodiment, a list of the suggested countermeasures provided at 418 by PIT 128 may include recommendations to adjust antenna tilt, add new antenna, increase power, or the like. These recommendations may be ranked based on historical user feedback as described above. If PIT 128 does not find that spatial density of subscribers at a cell edge exceeds a threshold (decision block 420, "no" branch), the utilized knowledge model may include some additional evaluations (inference rules) or may recommend intervention by human experts with high level of technical skills. Accordingly, at 422, PIT 128 may perform advanced troubleshooting procedures that may be associated with a different set of inference rules.

Advantageously, the various embodiments described herein provide automated techniques for troubleshooting failures in a telecommunication network. The aforementioned embodiments use knowledge based model containing rule sets that are developed based on theoretical and empirical experience. Furthermore, the automated system disclosed herein is preferably configured to provide a ranked list of countermeasures based on historical information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
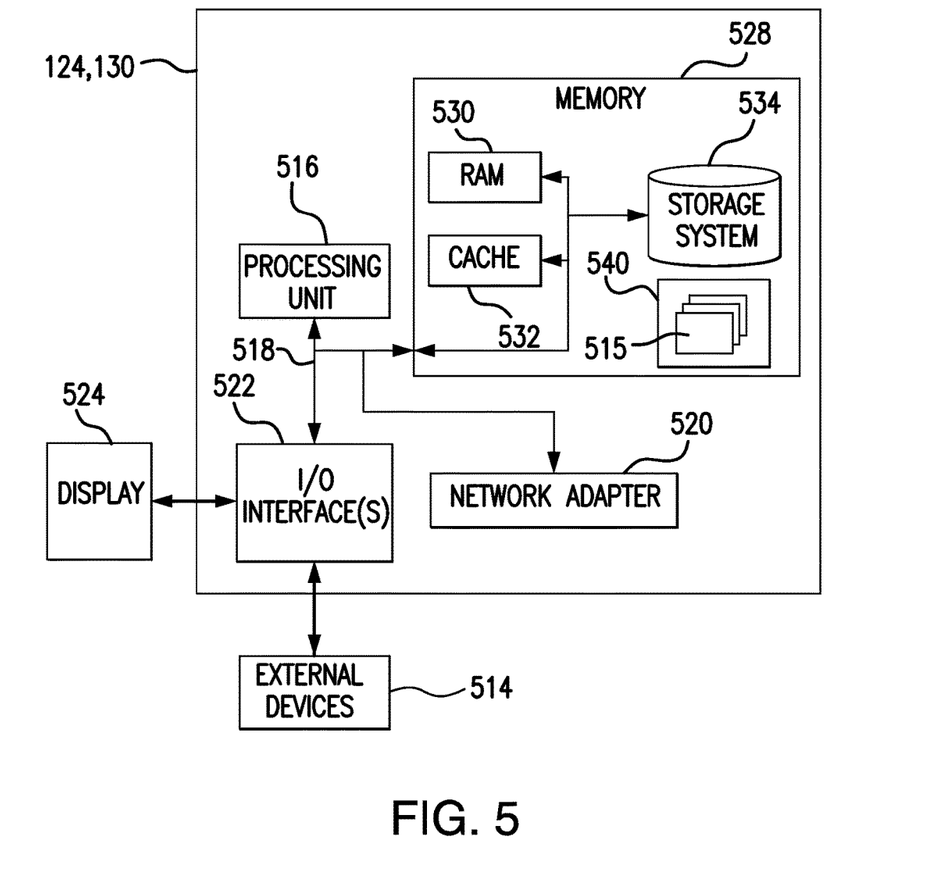
FIG. 5 illustrates internal and external components of system computers of FIG. 1 in accordance with an illustrative embodiment of the present invention.

FIG. 5 illustrates internal and external components of the troubleshooting system 124 and knowledge base system 130 servers in accordance with an illustrative embodiment. The servers 124 and 130 are only examples of a suitable server computer and are not intended to suggest any limitation as to the scope of use or functionality of embodiments of the invention described herein. Regardless, the servers 124 and 130 are capable of being implemented and/or performing any of the functionality set forth hereinabove.

The servers 124 and 130 are operational with numerous other general purpose or special purpose computing system environments or configurations. Examples of well-known computing systems, environments, and/or configurations that may be suitable for use with the servers 124 and 130 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The servers 124 and 130 may be described in the general context of computer system-executable instructions, such as program modules, being executed by a computer system. Generally, program modules may include routines, programs, objects, components, logic, data structures, and so on that perform particular tasks or implement particular abstract data types. The servers 124 and 130 may be practiced in distributed data processing environments where tasks are performed by remote processing devices that are linked through a communications network. In a distributed data processing environment, program modules may be located in both local and remote computer system storage media including memory storage devices.

The servers 124 and 130 are shown in FIG. 5 in the form of a general-purpose computing device. The components of the servers 124 and 130 may include, but are not limited to, one or more processors or processing units 516, a system memory 528, and a bus 518 that couples various system components including the system memory 528 to the processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The servers 124 and 130 typically include a variety of computer system readable media. Such media may be any available media that is accessible by the servers 124 and 130, and it includes both volatile and non-volatile media, removable and non-removable media.

The system memory 528 can include computer system readable media in the form of volatile memory, such as random access memory (RAM) 530 and/or cache memory 532. The servers 124 and 130 may further include other removable/non-removable, volatile/non-volatile computer system storage media. By way of example only, a storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As will be further depicted and described below, the memory 528 may include at least one program product having a set (e.g., at least one) of program modules that are configured to carry out the functions of embodiments of the invention.

A program/utility 540, having a set (at least one) of program modules 515, such as the SIT 126, PIT 128, GUI 132 and KBS analyzer 134, may be stored in the memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

The servers 124 and 130 may also communicate with one or more external devices 514 such as a keyboard, a pointing device, a display 524, etc.; one or more devices that enable a user to interact with the servers 124 and 130; and/or any devices (e.g., network card, modem, etc.) that enable the servers 124, 130 to communicate with one or more other computing devices. Such communication can occur via Input/Output (I/O) interfaces 522. Still yet, the servers 124, 130 can communicate with one or more networks such as a local area network (LAN), a general wide area network (WAN), and/or a public network (e.g., the Internet) via a network adapter 520. As depicted, the network adapter 520 communicates with the other components of the servers 124, 130 via the bus 518. It should be understood that although not shown, other hardware and/or software components could be used in conjunction with the servers 124, 130. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for performing root cause analysis of failures in a telecommunication network including at least a core network and radio access network (RAN), the computer system comprising one or more processors, one or more computer-readable storage devices, and a plurality of program instructions stored on at least one of the one or more storage devices for execution by at least one of the one or more processors, the plurality of program instructions comprising:

program instructions to receive information related to one or more failures reported in the telecommunication network;

program instructions to identify one or more network elements associated with the one or more reported network failures;

program instructions to analyze performance and configuration data associated with the one or more identified network elements to identify one or more causes of the one or more reported network failures, wherein if the one or more network elements are components of a core network the analyzed data comprises at least one of Simple Network Management Protocol (SNMP) data, network element's syslog data and Change Management (CM) log data; and program instructions to perform a root cause analysis of the one or more reported network failures using a knowledge model for each of the one or more identified causes to provide at least one automatic recommendation for resolving the one or more reported network failures, wherein the knowledge model comprises a plurality of predefined inference rules and a statistical inference model, wherein each of the plurality of predefined inference rules associates at least one cause of the one or more reported network failures with at least one recommendation for resolving the one or more reported network failures, and wherein the statistical inference model is configured to estimate relevance of the at least one automatic recommendation provided by the plurality of predefined inference rules based on analyzed historical information related to previously provided recommendations.

2. The computer system of claim 1, wherein the one or more computer-readable storage devices are configured to store the performance and configuration data and wherein the one or more computer-readable storage devices comprise:

a first computer-readable storage device configured to store network inventory data including physical network information and logical network information;

a second computer-readable storage device configured to store User Equipment (UE) signaling data, core network signaling data and RAN network signaling data;

a third computer-readable storage device configured to store network performance information associated with the core network and the RAN network;

a fourth computer-readable storage device configured to store network fault management information associated with the core network and the RAN network; and a fifth computer-readable storage device configured to store network configuration information associated with the core network and the RAN network.

3. The computer system of claim 2, wherein the one or more failures reported in the telecommunication network comprise one or more failures reported by a subscriber or the telecommunications network and wherein the information related to the one or more failures includes at least subscriber and network identity information.

4. The computer system of claim 3, wherein the program instructions to identify one or more network elements associated with the one or more reported network failures comprise program instructions to extract the stored call signaling data associated with the subscriber identity and user equipment information from the second computer-readable storage device, program instructions to extract the stored physical network information and logical network information from the first computer-readable storage device and program instructions to correlate the extracted physical network information with the logical network information with one or more logical network elements based on the extracted call signaling data.

5. The computer system of claim 2, wherein the program instructions to analyze performance and configuration data associated with the one or more identified network elements comprise program instructions to determine an operational state of each of the one or more identified network elements based on the performance information stored in the third computer-readable storage device.

6. The computer system of claim 5, wherein the program instructions to analyze performance and configuration data associated with the one or more identified network elements further comprise program instructions to correlate the determined operational state of each of the one or more identified network elements at least with the network fault management information stored in the fourth computer-readable storage device and the network configuration information stored in the fifth computer-readable storage device to identify one or more paths associated with the one or more reported network failures.

7. The computer system of claim 5, wherein the program instructions to analyze performance and configuration data associated with the one or more identified network elements further comprise program instructions to formulate a problem statement describing the identified cause of the one or more reported network failures.

8. The computer system of claim 1, further comprising program instructions to render a user interface configured to collect a user feedback associated with the at least one automatic recommendation for resolving the one or more reported network failures.

9. The computer system of claim 8, further comprising program instructions to rank the identified one or more causes based at least in part on the collected user feedback.

10. The computer system of claim 8, further comprising program instructions to rank the at least one provided automatic recommendation for resolving the one or more reported network failures based at least in part on the collected user feedback.

11. The computer system of claim 1, wherein the telecommunications network further includes IP Multimedia Subsystem (IMS) and Voice over Long Term Evolution (VoLTE) network.

12. The computer system of claim 11, wherein the one or more network elements comprise at least some of one or more UE devices, one or more access network elements, one or more core network elements, one or more IMS network elements, one or more VoLTE network elements.

13. A computer system for performing end-to-end network performance and service analysis in a telecommunication network including at least a core network and radio access network (RAN), the computer system comprising one or more processors, one or more computer-readable storage devices, and a plurality of program instructions stored on at least one of the one or more storage devices for execution by at least one of the one or more processors, the plurality of program instructions comprising:
  program instructions to receive information related to one or more performance issues reported in the telecommunication network;
  program instructions to identify one or more network elements related to the one or more reported performance issues or service under investigation;
  program instructions to analyze performance and configuration data associated with the one or more identified network elements to identify one or more causes of the one or more reported performance issues, wherein if the one or more network elements are components of a core network the analyzed data comprises at least one of Simple Network Management Protocol (SNMP) data, network element's syslog data and Change Management (CM) log data; and
  program instructions to perform a correlated subscriber signaling and network performance analysis of the one or more reported performance issues using a knowledge model for each of the one or more identified performance issues to provide at least one automatic recommendation for resolving the one or more reported performance issues, wherein the knowledge model comprises a plurality of predefined inference rules and a statistical inference model, wherein each of the plurality of predefined inference rules associates at least one cause of the one or more performance issues with at least one recommendation for resolving the one or more performance issues, and wherein the statistical inference model is configured to estimate relevance of the at least one automatic recommendation provided by the plurality of predefined inference rules based on analyzed historical information related to previously provided recommendations.

14. The computer system of claim 13, wherein the one or more performance issues reported in the telecommunications network comprise one or more Key Performance Indicator (KPI) violations.

15. A computer program product for performing root cause analysis of failures in a telecommunication network including at least a core network and radio access network (RAN), the computer program product comprising:
  one or more non-transitory computer-readable storage devices and a plurality of program instructions stored on at least one of the one or more non-transitory computer-readable storage devices, the plurality of program instructions comprising:
  program instructions to receive information related to one or more failures reported in the telecommunication network;
  program instructions to identify one or more User Equipment (UE) and network elements associated with the one or more reported network failures;
  program instructions to analyze performance and configuration data associated with the one or more identified network elements to identify one or more causes of the one or more reported network failures, wherein if the one or more network elements are components of a core network the analyzed data comprises at least one of Simple Network Management Protocol (SNMP) data, network element's syslog data and Change Management (CM) log data; and program instructions to perform a root cause analysis of the one or more reported network failures using a knowledge model for each of the one or more identified causes to provide at least one automatic recommendation for resolving the one or more reported network failures, wherein the knowledge model comprises a plurality of predefined inference rules and a statistical inference model, wherein each of the plurality of predefined inference rules associates at least one cause of the one or more reported network failures with at least one recommendation for resolving the one or more reported network failures, and wherein the statistical inference model is configured to estimate relevance of the at least one automatic recommendation provided by the plurality of predefined inference rules based on analyzed historical information related to previously provided recommendations.

16. The computer program product of claim 15, wherein the one or more non-transitory computer-readable storage devices are configured to store the performance and configuration data and wherein the one or more non-transitory computer-readable storage devices comprise:
   a first computer-readable storage device configured to store network inventory data including physical network information and logical network information;
   a second computer-readable storage device configured to store UE signaling data, core network signaling data and RAN network signaling data;
   a third computer-readable storage device configured to store network performance information associated with the core network and the RAN network;
   a fourth computer-readable storage device configured to store network fault management information associated with the core network and the RAN network; and
   a fifth computer-readable storage device configured to store network configuration information associated with the core network and the RAN network.

* * * * *